Aug. 19, 1941.   M. KATCHER   2,252,772
HYDRAULIC STEERING STABILIZER
Filed Aug. 10, 1939   2 Sheets-Sheet 1

INVENTOR
*Morris Katcher*
BY
*Emanuel Scheyer*
ATTORNEY

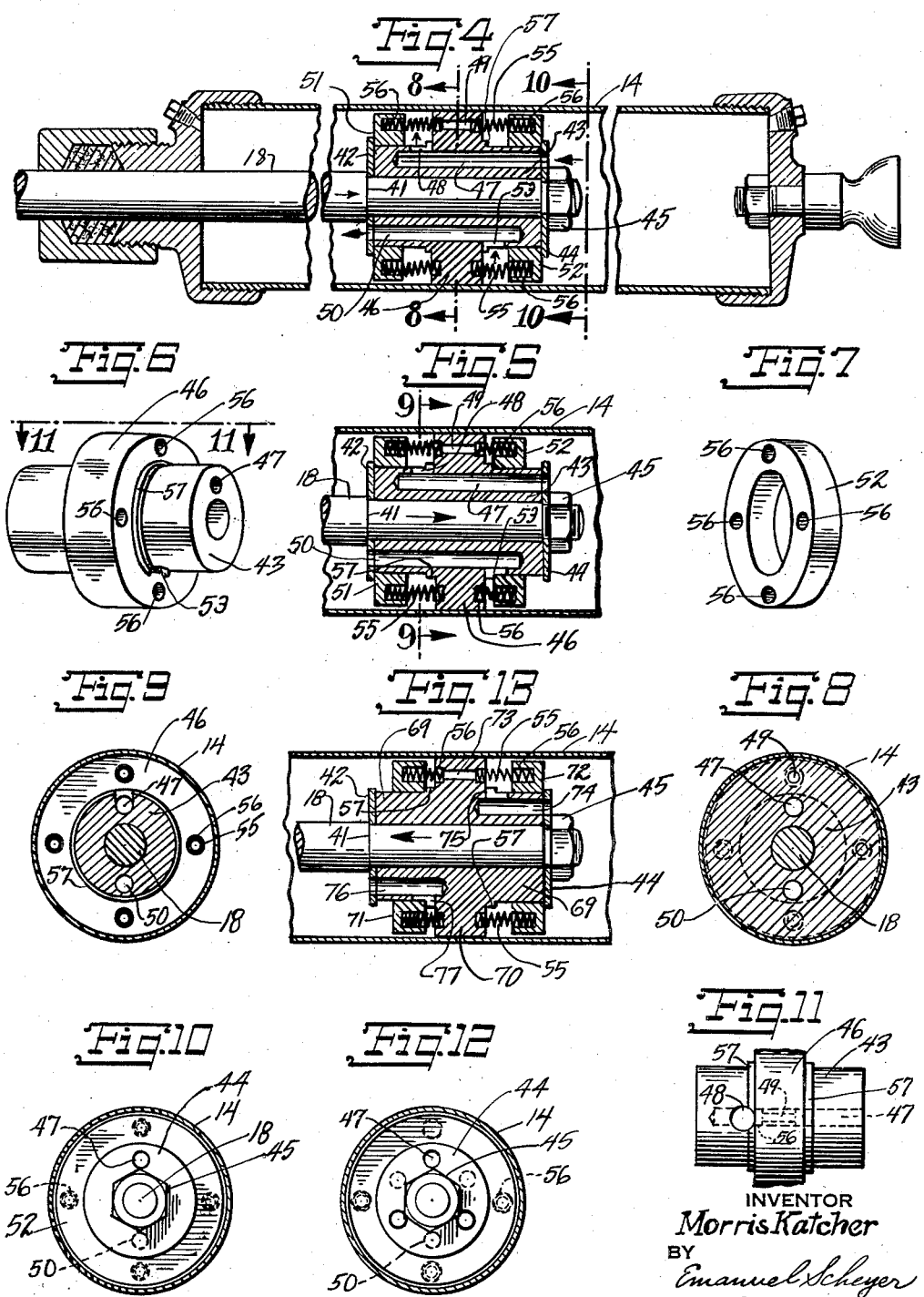

Patented Aug. 19, 1941

2,252,772

UNITED STATES PATENT OFFICE 2,252,772

HYDRAULIC STEERING STABILIZER

Morris Katcher, New York, N. Y.

Application August 10, 1939, Serial No. 289,356

12 Claims. (Cl. 280—90)

This invention relates primarily to a stabilizer for the steering apparatus of motor vehicles, (although it is not limited to such specific use) and it has for its prime object the provision of means for application to the steering apparatus which will act to maintain the front wheels of the vehicle in their proper position to hold the vehicle in a steady course, and prevent so-called "shimmy" or wabble of the front wheels.

A further object is to provide mechanism of the above character which can be easily and quickly applied to existing vehicles without the necessity for any material change or alteration in the vehicles, and which is equally applicable to new vehicles without any material structural alteration therein.

Another object is to provide mechanism of the above character so constructed and arranged that the ordinary operation of the steering apparatus is but little interfered with, but that sudden shocks will be prevented from turning the wheels off their course.

A further object is to provide a device of the above character which will be simple and inexpensive in construction and simple and efficient in operation.

Another object is to provide mechanism of the above character which will, in the event of a tire being suddenly deflated such as by a "blow out" or being "thrown" while the vehicle is in motion, act to hold the vehicle to its course, thus greatly reducing, if not entirely eliminating, the possibility of overturning.

This invention differs materially as far as the piston head construction is concerned from that shown in my pending application, Serial No. 238,946.

Other objects and advantages will become apparent upon further study of the description and drawings, in which:

Fig. 4 is a longitudinal section through the shock absorber, parts of the cylinder being broken out, the valve sleeves being in normal position. This figure shows a different arrangement of passages from Fig. 3 and is my preferred form.

Fig. 5 is a section of my preferred form taken similarly to Fig. 4 with most of the cylinder broken away and shows the valve sleeves in their position due to shock where the piston is forced to the right with reference to the cylinder.

Fig. 6 is a perspective view of the piston shown by itself with the valves and springs removed.

Fig. 7 is a perspective view of a valve sleeve shown by itself.

Fig. 8 is a section taken along the line 8—8 of Fig. 4.

Fig. 9 is a section taken along the line 9—9 of Fig. 5.

Fig. 10 is a section taken along the line 10—10 of Fig. 4.

Fig. 11 is a plan view looking along the line 11—11 of Fig. 6.

Fig. 12 is a section taken similarly to Fig. 10 except that the piston is provided with six passages instead of two, and Fig. 13 is a section taken similarly to Fig. 5 showing another arrangement of ports and passages, the valve sleeves being in position due to shock where the piston is forced to the left with reference to the cylinder.

Figure 1:
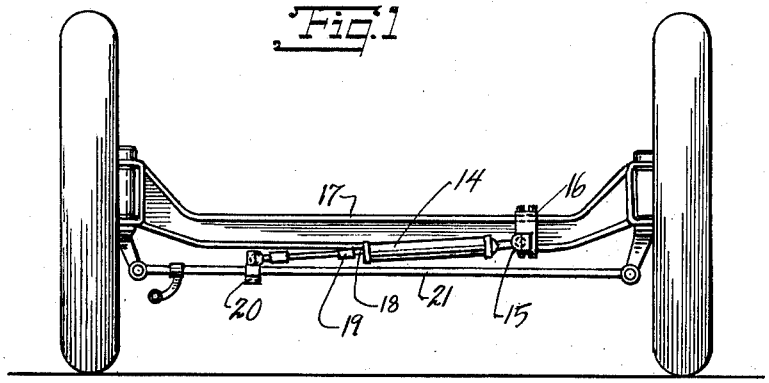
Fig. 1 is a front view of an automobile front axle, wheels and steering rod with the stabilizer mounted in place.

The cylinder 14 of the stabilizer is connected through a universal joint 15 to a bracket 16 on the axle 17 of the automobile. Piston rod 18 is connected through a universal joint 19 to a bracket 20 on steering rod 21.

Figure 2:
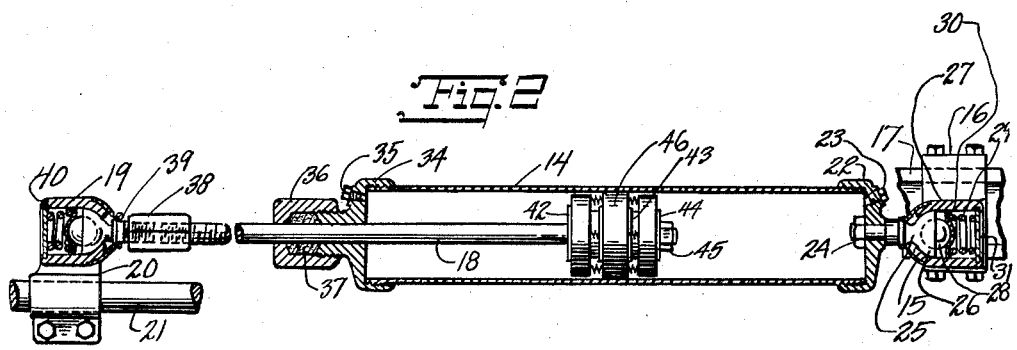
Fig. 2 is a longitudinal section of the stabilizer to an enlarged scale, over that of Fig. 1, and shows its attachment to portions of the front axle and steering rod.

One end of cylinder 14, Figs. 2 and 4, is closed by head 22 which is screwed thereon. Filling screw 23 is provided for the introduction of the stabilizer fluid. Rigidly attached to head 22 by means of bolt 24 is stud 25. The other end of stud 25 has a hemispherical head 26 which is slidably mounted on a spherical inside surface of sleeve 27, allowing a limited universal rotation between said head and sleeve, which form parts of the universal joint 15, Fig. 1. The top of head 26 is provided with a hemispherical cup in which ball bearing 28 is mounted. Ball bearing 28 is held pressed against head 26 by means of spring 29, plate 30 and cap 31. The particular type of universal joint shown is discussed in my pending application Serial #188,222, now Patent No. 2,178,206, granted October 31, 1939. I wish it to be understood that other types of universal joint are suitable for use in my construction. Sleeve 27 has bracket 16 formed thereon. Said bracket is fastened to axle 17.

The other end of cylinder 14 has screwed thereon a head 34 provided with a filling screw 35.

The outer end of head 34 is threaded to receive a gland 36 provided with packing 37. Piston rod 18 passes through cap 34 and gland 36 with a sliding fit. The outer end of piston rod 18 is threaded to receive screw coupling 38. The other end of the coupling is fastened to stud 39 of the universal joint 19. Sleeve 40 of joint 19 is attached to bracket 20 which is bolted to steering rod 21. Joint 19 is similar to joint 15 described above.

The inner end of piston rod 18, Figs. 2 and 4-11, is reduced in diameter providing a shoulder 41 against which is set a washer 42 and against said washer is set piston 43. Against the outer end of piston 43 is set washer 44, and the whole assembly is pulled up tight against shoulder 41 by nut 45. Piston 43 is provided with an integral collar 46 having a sliding fit with the inside of cylinder 14. A passage 47 extends from near the left end of piston 43 clear to its right end and out through washer 44. A radial port or opening 48, to the left of collar 46, extends from passage 47 to the outside of piston 43. Another passage 50 extends from near the right end of piston 43 clear to its left end and out through washer 42. A radial opening 53 to the right of collar 46 extends from passage 50 to the outside of piston 43. Slidably mounted on piston 43 to the left of collar 46 is a valve sleeve 51 and to the right of said collar is a valve sleeve 52. Between sleeve 51 and collar 46 are four coil springs 55 located at quarter points, recesses 56 being provided in the sleeve and collar to receive the ends of said springs. In a similar manner there are four springs 55 between sleeve 52 and collar 46 setting in corresponding recesses 56. Normally said springs hold sleeves 51 and 52 out against washers 42 and 44 respectively. There is a passage 49 through collar 46 between upper recesses 56. Alongside each face of collar 46 is a shoulder 57 which prevents its corresponding valve sleeve, due to a force described hereafter, from coming all the way up against the corresponding face of said collar and thus completely closing off the radial ports 48 and 53. In the case of sleeve 51, the left shoulder 57 prevents the complete closure of port 48. In the case of sleeve 52, the right shoulder 57 prevents the complete closure of opening or port 53. There is just enough clearance between the outside of sleeves 51 and 52 and the inside of cylinder 14 to avoid friction drag.

During ordinary steering, the relative motion between piston 43 and cylinder 14 is not fast or sudden enough to displace valve sleeves 51 and 52 from their normal position as shown in Fig. 4. If the piston moves, say to the right, under these conditions, liquid will flow from cylinder 14 at the right of piston 43 into passage 47, out opening 48 into the annular space between valve sleeve 52 and collar 46, passing back through recess 56 into passage 49 through collar 46 and out therefrom through another recess 56 into the annular space between collar 46 and sleeve 52, through port 53 into passage 50 and out to the left of piston 43. The reverse flow takes place if piston 43 is moved to the left in normal steering.

If piston 43 should move suddenly to the right due, say, to one of the front wheels hitting an obstruction, valve sleeve 52 would assume the position shown in Fig. 5. The liquid not being able to flow fast enough through the openings and passages as described above, it exerts pressure against sleeve 52 forcing it to the left. This closes off most of opening 53 almost completely stopping the flow of liquid from the right of piston 43 to its left causing such an increase of pressure momentarily in the liquid to the right of said piston that there is no relative motion between said piston and cylinder 14 preventing, thereby, sudden swerving of the front wheels. If piston 43 should move suddenly to the left, the reverse of conditions just described would take place, valve sleeve 51 moving to close off port 48. The momentary pressures built up by shock of sudden incipient turning of the front wheels is soon relieved by leakage of liquid through either port 48 or port 53 which ports are kept slightly open by shoulders 57.

Figure 3:
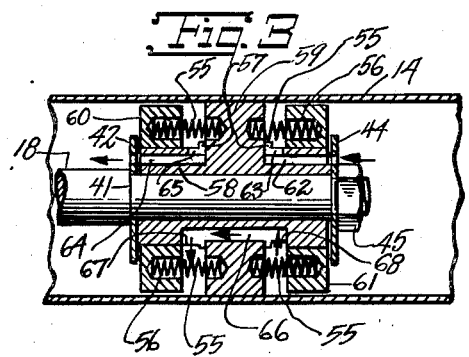
Fig. 3 is a longitudinal section through the piston and a part of the cylinder of the stabilizer with the valve sleeves in normal position and shows one arrangement of liquid passages.

The modification of my device shown in Fig. 3, comprises a piston 58 having a collar 59. Slidably mounted on piston 58 to the left of said collar is a valve sleeve 60 and to the right of said collar is a valve sleeve 61. Shoulder 41, washers 42 and 44 and nut 45 are placed similarly to that shown in Fig. 4. Collar 59 has a sliding fit with the inside of cylinder 14. A passage 62 extends through washer 44 into piston 58 stopping at collar 59. A radial port 63 connects passage 62 with the space alongside piston 58 to the right of collar 59. A passage 64 extends through washer 42 into piston 58 stopping at collar 59. A radial port 65 connects passage 64 with the space alongside piston 58 to the left of collar 59. On the opposite side of piston 58 from passages 62 and 64 is a passage 66 extending from one side of collar 59 to the other and out through radial ports 67 and 68. Keeping sleeves 60 and 61 backed against washers 42 and 44 respectively are four coil springs 55 on each side of collar 59 and located at quarter points, recesses 56 being provided in the sleeves and collar to receive the ends of the springs. Shoulders 57 are provided to prevent ports 63, 65, 67 and 68 from being entirely closed, for reasons similar to that given above in connection with the construction shown in Fig. 4.

During ordinary steering, the relative motion between piston 58 and cylinder 14 is not fast or sudden enough to displace valve sleeves 60 and 61 from their normal position as shown in Fig. 3. If the piston moves, say to the right, under these conditions, liquid will flow from cylinder 14 at the right of piston 58 into passage 62, out port 63 into the annular space between valve sleeve 61 and collar 59. From said space, the liquid enters passage 66 through port 68, out of said passage through port 67, into the annular space between valve sleeve 60 and collar 59. From said latter space the liquid passes through port 65 into passage 64 and out through the opening in washer 42 into cylinder 14 to the left of piston 58. The reverse flow takes place if piston 58 is moved to the left in normal steering.

If piston 58 should move suddenly to the right due, say, to one of the front wheels hitting an obstruction, valve sleeve 61 would be pushed against right shoulder 57, substantially closing off port 63 and the flow through passage 62, causing such an increase of pressure momentarily in the liquid to the right of piston 58, that there is no relative motion between said piston and cylinder 14, preventing, thereby, sudden swerving of the front wheels. If piston 58 should move suddenly to the left, the reverse of conditions just described would take place, valve sleeve 60 moving to close off port 65. The momentary pressures built up are soon relieved by leakage of liquid through either port 63 or port 65, which ports are kept slightly open by shoulders 57.

The modification shown in Fig. 12 is similar to that already described except that instead of the piston having only one passage 47 and one passage 50, it has three such passages as 47 and three such passages as 50.

The modification shown in Fig. 13 comprises a piston 69 having a collar 70. Slidably mounted on piston 69 to the left of said collar is a valve sleeve 71 and to the right of said collar is a valve sleeve 72. Shoulder 41, washers 42 and 44 and nut 45 are placed similarly to that shown in Fig. 4. Collar 70 has a sliding fit with the inside of cylinder 14. Between collar 70 and valve sleeves 71 and 72 are springs 55 which normally hold valve sleeves 71 and 72 back against washers 42 and 44 respectively. The ends of springs 55 are set in recesses 56 in collar 70 and valve sleeves 71 and 72. Between the upper pair of recesses 56 in collar 70 is a passage 73. A passage 74 extends through washer 44 into piston 69 stopping at collar 70. A port 75 connects passage 74 with the space alongside of piston 69 to the right of collar 70. Another passage 76 extends through washer 42 into piston 69 stopping at collar 70. A radial port 77 connects passage 76 with the space alongside piston 69 to the left of collar 70. Shoulders 57 are provided to prevent ports 75 and 77 from being entirely closed as explained under similar conditions with the construction shown in Fig. 4.

As explained for the previous constructions, during ordinary steering, the relative motion between piston 69 and cylinder 14 is not fast or sudden enough to displace valve sleeves 71 and 72 from their normal positions against washers 42 and 44 respectively. If the piston moves, say to the right, under these conditions liquid will flow from cylinder 14 at the right of piston 69 into passage 74, out port 75 into the annular space between valve sleeve 72 and collar 70, through passage 73 into the annular space between valve sleeve 71 and collar 70, into passage 76 through port 77 and out said latter passage into the space in cylinder 14 to the left of piston 69. The reverse flow takes place if piston 69 is moved to the left in normal steering. Upon sudden motion to the left of piston 69, valve sleeve 71 is caused to bear against left shoulder 57, as shown in Fig. 13, substantially closing off port 77 and the flow through passage 76, causing such an increase of pressure momentarily in the liquid to the left of piston 69, that there is no relative motion between said piston and cylinder 14, preventing, thereby, sudden swerving of the front wheels. If piston 69 should move suddenly to the right, the reverse of conditions just described would take place, valve sleeve 72 moving to close off port 75. The momentary pressures built up are soon relieved by leakage of liquids through either port 77 or 75, which ports are kept slightly open by shoulders 57.

I claim:

1. A stabilizer for the steering mechanism of a vehicle comprising a liquid containing cylinder and a piston movable therein, said stabilizer adapted for connection between a part of the vehicle stationary with respect to the steering mechanism and the steering mechanism, said piston having an intermediate portion slidably engaging the inside face of the cylinder, the end parts of the piston, one on each side of said intermediate portion, being of substantially less diameter than the inside of the cylinder, said piston having a passage extending through it terminating substantially at the right and left faces of said intermediate portion, a valve member slidably mounted on each of said parts and extending substantially to the inside face of the cylinder, and springs normally holding each member toward the outer end of the part on which it is mounted in spaced relation to said intermediate portion, said piston having also a passage extending inward from its right end to the left side of said intermediate portion and another passage extending inward from its left end to the right side of said intermediate portion, the inner end of each passage having a port extending to the space around the piston, each port being substantially adjacent said intermediate portion, the valve members leaving the ports open when said members are in normal position permitting a substantial flow of liquid past the piston, and substantially closing off one of said ports substantially to cut off the flow when a sudden relative motion of the piston and the cylinder displaces a member from its normal position.

2. A stabilizer for the steering mechanism of a vehicle comprising a liquid containing cylinder and a piston movable therein, said stabilizer adapted for connection between a part of the vehicle stationary with respect to the steering mechanism and the steering mechanism, said piston having an intermediate portion slidably engaging the inside face of the cylinder, the end parts of the piston, one on each side of said intermediate portion, being of substantially less diameter than the inside of the cylinder, said piston having a passage extending through it terminating substantially at the right and left faces of said intermediate portion, a valve member slidably mounted on each of said parts and extending substantially to the inside face of the cylinder, and springs normally holding each member toward the outer end of the part on which it is mounted in spaced relation to said intermediate portion, said piston also having a passage extending inward from its right end and another passage extending inward from its left end, the inner end of each passage having a port extending to the space around the piston, each port being substantially adjacent said intermediate portion, the valve members leaving the ports open when said members are in normal position permitting a substantial flow of liquid past the piston and substantially closing off one of said ports substantially to cut off the flow when a sudden relative motion of the piston and the cylinder displaces a member from its normal position.

3. A stabilizer for the steering mechanism of a vehicle comprising a liquid containing chamber and a plunger movable therein, said stabilizer adapted for connection between a part of the vehicle stationary with respect to the steering mechanism and the steering mechanism, said plunger having an intermediate portion with its periphery slidably engaging the inside face of the chamber substantially preventing liquid from passing between said periphery and said face, the end parts of the plunger being of less cross-section than said intermediate portion, a valve member slidably mounted on each of said parts and extending substantially to the inside face of the chamber, said plunger having a plurality of ports and passages extending through its intermediate portion and end parts for leading the flow of liquid from one side of the plunger to the other, said valve members in accordance with their positions opening and substantially closing said ports for respectively permitting or substantially cutting off said flow, and spring means for holding the valve members in normal position, said members when in normal position permitting said flow, said flow being substantially cut off when a sudden relative motion of the plunger and chamber displaces a member from its normal position.

4. A stabilizer for the steering mechanism of a vehicle comprising a liquid containing chamber and a plunger movable therein, said stabilizer adapted for connection between a part of the vehicle stationary with respect to the steering mechanism and the steering mechanism, said plunger having an intermediate portion with its periphery slidably engaging the inside face of the chamber substantially preventing liquid from passing between said periphery and said face, the end parts of the plunger being of less cross-section than said intermediate portion, a valve member slidably mounted on each of said parts and extending substantially to the inside face of the chamber, said plunger having a plurality of ports and passages extending through its intermediate portion and end parts for leading the flow of liquid from one side of the plunger to the other, said valve members when in normal position leaving the ports open and permitting said flow, and spring means for holding said valve members in normal position, a sudden relative motion between the plunger and the chamber displacing the valve member at the forward part of the plunger with respect to the motion, substantially closing off a port thereby and cutting off said flow.

5. A stabilizer as claimed in claim 3 in which the spring means comprises a plurality of helical springs at spaced intervals around the plunger, each spring extending from the intermediate portion of the plunger to a valve member, holding said member in spaced relation to said intermediate portion for normal position, each end of the springs setting in a substantial recess, the recess for one end being provided in the intermediate portion and the recess for the other end being provided in a valve member.

6. A stabilizer for the steering mechanism of a vehicle comprising a liquid containing cylinder and a piston movable therein, said stabilizer adapted for connection between a part of the vehicle stationary with respect to the steering mechanism and the steering mechanism, said piston having an intermediate portion slidably engaging the inside face of the cylinder, the end parts of the piston being of less diameter than said intermediate portion, a valve member slidably mounted on each of said parts, said piston having a plurality of passages and ports for leading the flow of liquid from one side of the piston to the other, said ports being located adjacent the sides of said intermediate portion and being substantially closed when the members are brought with their internal faces at their bores over said ports and substantially adjacent said intermediate portion substantially stopping said flow, and permitting said flow when the members are moved away from said intermediate portion and substantially off said ports.

7. A stabilizer as claimed in claim 6 in which there is an annular shoulder on each of the end parts of the piston adjacent each side of said intermediate portion, said shoulders preventing the valve members from completely closing off said ports when they are moved adjacent said intermediate portion, permitting leakage of liquid from one side of the piston to the other.

8. A stabilizer for the steering mechanism of a vehicle comprising a liquid containing cylinder and a piston movable therein, said stabilizer adapted for connection between a part of the vehicle stationary with respect to the steering mechanism and the steering mechanism, said piston having an intermediate portion slidably engaging the inside face of the cylinder, the end parts of the piston, one on each side of said intermediate portion, being of substantially less diameter than the inside of the cylinder, said piston having a passage extending through it terminating substantially at the right and left faces of said intermediate portion, a valve member slidably mounted on each of said parts and extending substantially to the inside face of the cylinder, and springs normally holding each member toward the outer end of the part on which it is mounted in spaced relation to said intermediate portion, said piston having also a passage extending inward from its right end and terminating at a port communicating with the space around the piston to the right of said intermediate portion and another passage extending inward from its left end and terminating at a port communicating with the space around the piston to the left of said intermediate portion, the valve members leaving said ports open when said members are in normal position permitting a substantial flow of liquid past the piston and substantially closing off one of said ports substantially to cut off the flow when a sudden relative motion of the piston and the cylinder displaces a member from its normal position.

9. A stabilizer as claimed in claim 2 in which the passage extending inward from the right end of the piston and the passage extending inward from the left end of the piston are on substantially opposite sides of the longitudinal axis of the piston.

10. A stabilizer as claimed in claim 8 in which the passage extending inward from the right end of the piston and the passage extending inward from the left end of the piston are on substantially the same side of the longitudinal axis of the piston.

11. A stabilizer as claimed in claim 8 in which the passage extending through the piston and terminating substantially at the right and left faces of the intermediate portion is on one side of the longitudinal axis of the piston while the other passages which extend from the left and right ends of the piston are both on substantially the opposite side of said axis from said first passage.

12. A stabilizer for the steering mechanism of a vehicle comprising a liquid containing cylinder and a plunger movable therein, said stabilizer adapted for connection between a part of the vehicle stationary with respect to the steering mechanism and the steering mechanism, said plunger having a portion with its periphery slidably engaging the inside face of the cylinder substantiallly preventing liquid from passing between said periphery and said face, valve members adjacent said portion, one on each side thereof and movably mounted with respect to said portion, to move to and from said portion, said members being of sufficiently less outside diameter than the inside diameter of the cylinder to relieve them of friction drag against the cylinder, yet of a sufficiently large outside diameter to stop substantially any flow past their peripheries, said plunger having a plurality of passages extending beyond the valve members for leading the flow of liquid from one side of the plunger to the other beyond the valve members, said valve members in accordance with their positions substantially opening and closing the passages for respectively permitting or substantially cutting off said flow, and spring means for holding the valve members in normal position, said members when in normal position permitting said flow, said flow being substantially cut off when a sudden relative motion of the plunger and cylinder displaces a member from its normal position.

MORRIS KATCHER.